US011190488B1

(12) United States Patent
Marino et al.

(10) Patent No.: US 11,190,488 B1
(45) Date of Patent: Nov. 30, 2021

(54) ADAPTIVE SECURITY FILTERING ON A CLIENT DEVICE

(71) Applicant: SYMANTEC CORPORATION, Mountain View, CA (US)

(72) Inventors: Daniel Marino, Los Angeles, CA (US); Daniel Kats, Culver City, CA (US); Brian Schlatter, Playa Vista, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 351 days.

(21) Appl. No.: 16/296,178

(22) Filed: Mar. 7, 2019

(51) Int. Cl.
*H04L 29/06* (2006.01)
*H04L 12/26* (2006.01)
*G06F 21/55* (2013.01)
*H04L 12/851* (2013.01)

(52) U.S. Cl.
CPC ........ *H04L 63/0245* (2013.01); *H04L 43/028* (2013.01); *H04L 63/1425* (2013.01); *H04L 63/20* (2013.01)

(58) Field of Classification Search
CPC ............. H04L 63/0245; H04L 63/1425; H04L 63/1433; H04L 63/1416; H04L 63/1408; H04L 63/20; H04L 43/028; G06F 21/554
See application file for complete search history.

(56) References Cited

U.S. PATENT DOCUMENTS

| | | | | |
|---|---|---|---|---|
| 7,353,538 | B2 * | 4/2008 | Sample | G06F 11/3495 726/23 |
| 7,647,622 | B1 | 1/2010 | Sobel et al. | |
| 9,602,381 | B1 * | 3/2017 | Jordan | G06Q 10/08 |
| 10,691,796 | B1 * | 6/2020 | Stolte | G06F 21/554 |
| 2003/0051054 | A1 * | 3/2003 | Redlich | H04L 63/20 709/246 |
| 2017/0251007 | A1 * | 8/2017 | Fujisawa | H04L 63/1425 |
| 2017/0353483 | A1 * | 12/2017 | Weith | H04L 63/20 |
| 2018/0191636 | A1 * | 7/2018 | Wang | H04L 47/32 |
| 2018/0255080 | A1 * | 9/2018 | Paine | H04L 63/1425 |
| 2018/0307833 | A1 * | 10/2018 | Noeth | H04L 63/1441 |
| 2019/0081962 | A1 * | 3/2019 | Teal | G06F 21/55 |
| 2020/0074078 | A1 * | 3/2020 | Saxe | H04L 63/1433 |
| 2020/0074336 | A1 * | 3/2020 | Saxe | G06F 21/565 |
| 2020/0074360 | A1 * | 3/2020 | Humphries | G06Q 10/06395 |
| 2020/0076833 | A1 * | 3/2020 | Ladnai | G06F 21/565 |
| 2020/0076834 | A1 * | 3/2020 | Ladnai | G06K 9/6256 |
| 2020/0076835 | A1 * | 3/2020 | Ladnai | G06F 16/955 |

(Continued)

OTHER PUBLICATIONS

Berlin, Konstantin, David Slater, and Joshua Saxe. "Malicious behavior detection using windows audit logs." Proceedings of the 8th ACM Workshop on Artificial Intelligence and Security. 2015. (Year: 2015).*

(Continued)

*Primary Examiner* — Michael Simitoski
(74) *Attorney, Agent, or Firm* — Maschoff Brennan (57) ABSTRACT

Adaptive security filtering on a client device. A method may include applying a data filter to a client device to obtain a first set of data associated with the client device, determining a risk level of a datum of the first set of data, determining a resource level associated with obtaining the first set of data, adjusting the data filter to an adjusted filter based on the determined risk level of the datum and the determined resource level, and applying the adjusted filter to the client device.

20 Claims, 4 Drawing Sheets

(56) References Cited

U.S. PATENT DOCUMENTS

| | | | | |
|---|---|---|---|---|
| 2020/0145439 | A1* | 5/2020 | Griggs | G06F 21/554 |
| 2020/0151327 | A1* | 5/2020 | Chen | G06F 21/85 |
| 2020/0153849 | A1* | 5/2020 | Watkiss | H04L 63/1425 |
| 2020/0287916 | A1* | 9/2020 | Aksela | H04L 63/1425 |
| 2020/0304523 | A1* | 9/2020 | Yadav | H04L 43/0894 |
| 2020/0304528 | A1* | 9/2020 | Ackerman | G06F 21/562 |

OTHER PUBLICATIONS

S. S. Sekharan and K. Kandasamy, "Profiling SIEM tools and correlation engines for security analytics," 2017 International Conference on Wireless Communications, Signal Processing and Networking (WiSPNET), Chennai, India, 2017, pp. 717-721, doi: 10.1109/WiSPNET.2017.8299855. (Year: 2017).*

Marino, Daniel; "How IntelliFilter Enables Fast, In-Depth Analysis of Endpoint Activity"; Aug. 29, 2018; Webpage located at: https://www.symantec.com/blogs/product-insights/how-intellifilter-enables-fast-depth-analysis-endpoint-activity; accessed on Mar. 12, 2019; 4 pages.

Forcepoint; "What is Adaptive Security? Adaptive Security Defined, Explained, and Explored"; 2019; Webpage located at: https://www.forcepoint.com/cyber-edu/adaptive-security; accessed on Mar. 12, 2019; 7 pages.

Gartner, Inc.; "Build Adaptive Security Architecture Into Your Organization"; Jun. 30, 2017; Webpage located at: https://www.gartner.com/smarterwithgartner/build-adaptive-security-architecture-into-your-organization/; accessed on Mar. 12, 2019; 6 pages.

Quora; "What is SOAR (security operations, analytics and reporting), and what are the different SOAR and SIEM?" May 21, 2018; Webpage located at: https://www.quora.com/What-is-SOAR-security-operations-analytics-and-reporting-and-what-are-the-different-SOAR-and-SIEM; accessed on Mar. 12, 2019; 3 pages.

Harvey, Cynthia; "8 Ways Security Automation and Orchestration Is Transforming Security Operations" Sep. 5, 2018; Webpage located at: https://www.esecurityplanet.com/network-security/security-automation-and-orchestration-soar.html; accessed on Mar. 12, 2019; 10 pages.

* cited by examiner

ADAPTIVE SECURITY FILTERING ON A CLIENT DEVICE

BACKGROUND

Attackers seeking to infiltrate a computer system or network may hide themselves on legitimate webpages or within legitimate processes and/or computing events within an enterprise. Such attacks may leverage new and unknown vulnerabilities and enter targeted enterprises using network-based protocols. Attacks may evade typical network-based security approaches, enabling attacks to infiltrate the enterprise's infrastructure and compromise systems and data.

Current threat protection software applications operating within an enterprise, having multiple computing devices in a network, may be constrained by bandwidth, storage capacity, processing capacity, and monetary limits. For example, a customer running threat protection software on a computing device on premises or in the cloud may be constrained by the amount of money they wish to or are able to pay. In some embodiments, therefore, the budget for threat protection must thus be shared among all of the computing device endpoints within an enterprise. As a result, this budget (resource, financial, etc.) may be divided equally among each of the computing devices within an enterprise, with each being treated identically from a telemetry gathering standpoint. In other words, each of the computing devices may share the same security filters, and the granularity of each of the filters may be static for each deployment of the application until the filter parameters are manually changed by an administrator. Thus, each of the computing devices may be treated as equally important and equally at risk for a security compromise when, in reality, that may not be the likely scenario.

Because each of the computing devices is subject to the same filter, the telemetry obtained may be obtained at an even rate, and with the same granularity, from each computing device. As a result, the analytics performed on the data may be constrained by the volume of data or the limit of storage. Furthermore, analysis may be reactionary, as opposed to proactive. Thus, existing solutions may not fully address the problem of security threats in enterprises having limited resources.

SUMMARY

In some embodiments, a computer-implemented method for adaptive security filtering on a client device may be performed, at least in part, by a computing device including one or more processors. The method may include applying a data filter to a client device to obtain a first set of data associated with the client device, determining a risk level of a datum of the first set of data, determining a resource level associated with obtaining the first set of data, adjusting the data filter to an adjusted data filter based on the determined risk level of the datum and the determined resource level, and applying the adjusted data filter to the client device.

In one embodiment, the adjusting of the data filter may further include increasing an amount of data obtained in the first set of data, decreasing the amount of data obtained in the first set of data, obtaining data for a pre-determined amount of time, or obtaining data from a second client device, or a combination thereof.

In some embodiments, the method may further include determining that the first set of data represents a potential security issue, and storing the first set of data in memory based on determining that the first set of data represents a potential security issue.

In some embodiments, the obtaining of the first set of data may further include obtaining process data associated with the client device. In these embodiments, the obtaining of the process data may further include obtaining data associated with a user logging onto the client device, a user logging the client device onto a network, writing to a file, obtaining access to a file, deleting a file, writing to a registry key, a process launch from an executable, or use of a command line argument, or a combination thereof.

In some embodiments, the determining of the risk level may further include determining the risk level based on at least one security risk factor. In these embodiments, the method may include assigning a weighted value to the at least one security risk factor.

In some embodiments, the determining of the resource level may further include determining a current usage of computing resources, determining a future usage of computing resources, determining an availability of current computing resources, or determining an available of future computing resources, or a combination thereof. In these embodiments, the determining of the resource level may further include determining network bandwidth, determining processing power, or determining a storage amount, or a combination thereof.

In some embodiments, a computer device may include a processor, a memory in electronic communication with the processor, and instructions stored in the memory, with the instructions being executable by the processor to perform a method for adaptive security filtering on a client device.

In some embodiments, one or more non-transitory computer-readable media may include one or more computer-readable instructions that, when executed by one or more computing devices, cause the one or more computing devices to perform a method for adaptive security filtering on a client device.

BRIEF DESCRIPTION OF THE DRAWINGS

Embodiments will be described and explained with additional specificity and detail through the use of the accompanying drawings in which.

DETAILED DESCRIPTION

In conventional systems, each of the computing devices in an enterprise system may be subject to the same filter, resulting in telemetry being obtained at an even rate, and with the same granularity, from each computing device. As a result, the analytics performed on the data may be constrained by the volume of data or the limit of storage, and analysis may be reactionary, as opposed to proactive.

In some systems, a data recorder may obtain and record in storage (e.g., a local ring buffer) fine-grained low-level event data for any or all processes initiated on or by a computing device. The computing device may be one of a group of computing devices that make up a network or are part of an enterprise of computing devices. Also, an enterprise may operate multiple subnets of a single or multiple networks.

Obtaining and recording process information and event data may enable forensic investigation for advanced threat protection, and may also enable cross-device analytics. For example, if a computing device is running a process filtering application, such as INTELLIFILTER® by SYMANTEC CORPORATION, then the rules of each application may dictate from which of the processing events data are obtained and sent to a storage device versus those processing events that are recognized, but not stored. Stored events may be analyzed at a later date, with a later decision made by a human administrator as to whether more or different data should be pulled.

Furthermore, the rules for filtering processing events and/or data may currently be binary and may not be adaptable on a scale based on real-time process determination; rather, an administrator may select, for example, "yes" or "no" on obtaining or storing all events associated with a specific process. In some cases, the filter may be part of an Advanced Threat Protection (ATP) appliance provided by SYMANTEC CORPORATION. The ATP appliance may be part of an Endpoint Detection and Response (EDR) system implemented to provide tools to determine and remediate advanced threats that may evade traditional anti-malware or intrusion prevention software.

More specifically, existing EDR technology may monitor, record, and analyze fine-grained behavioral information about any or every event occurring or process running on the endpoint. Events or processes may include, for example, a user logging into the system, writing to a particular registry key, a network connection, obtaining access to a file, writing to a file, etc.

In one embodiment, the ATP appliance may be a locally-used appliance and/or a cloud appliance. The ATP appliance may be constrained in terms of the amount of money a customer wishes to pay, especially in an enterprise setting where multiple computing devices are using the same appliance. Currently, each computing device within an enterprise is treated as identically important and identically at risk of a security compromise. Because security filters currently have default filtering, each computing device within the enterprise is subject to the same filter, and in the absence of a security incident, telemetry flows at an even rate from the filter application to the ATP appliance. Because there is no real-time adaptation of the filtering, the amount of analytics that can be performed on the telemetry is constrained. Furthermore, adjusting the filters (i.e., turning each filter on or off) currently requires manual intervention by a human administrator to collect full data logs given a security incident, as opposed to proactively pulling data logs in the case of a suspected or anticipated security event.

In other systems and methods, if something suspicious is detected through telemetry gathering related to events, a human administrator may need to manually review the process events at a specific endpoint at a specific time in order to glean some context regarding how an attack happened or what was breached, making any action by the administrator reactionary and difficult.

Current filters may enable large streams of data to build up and enable an administrator to analyze high-level behaviors, where some high-level behaviors may generate a security or informational alert. In addition, non-alerting behaviors may be tracked and summarized, creating a behavioral fingerprint for processes and system users related to how programs and users behave. This process, however, is not automated and is not autonomously adaptable in real-time or otherwise, and current filtering devices and applications are resource-constrained in bandwidth, storage, and processing capacity.

In contrast, the systems and methods described herein may provide pre-specified levels of filters to the ATP appliance, which may be dynamically increased (e.g., ratcheted up) or decreased (e.g., ratcheted down) based on a real-time currently-perceived security threat based on data obtained. In addition, real-time available storage and processing capacities of the ATP appliance may be taken into consideration when adjusting the filters. For example, filters may be adjusted to gather and store more information for machines and systems that are deemed riskier, where more information is desired, and/or where there are more resources, whereas filters may be adjusted to gather less information on systems and subnets where the risk is deemed lower, or where resources are limited.

Figure 1:
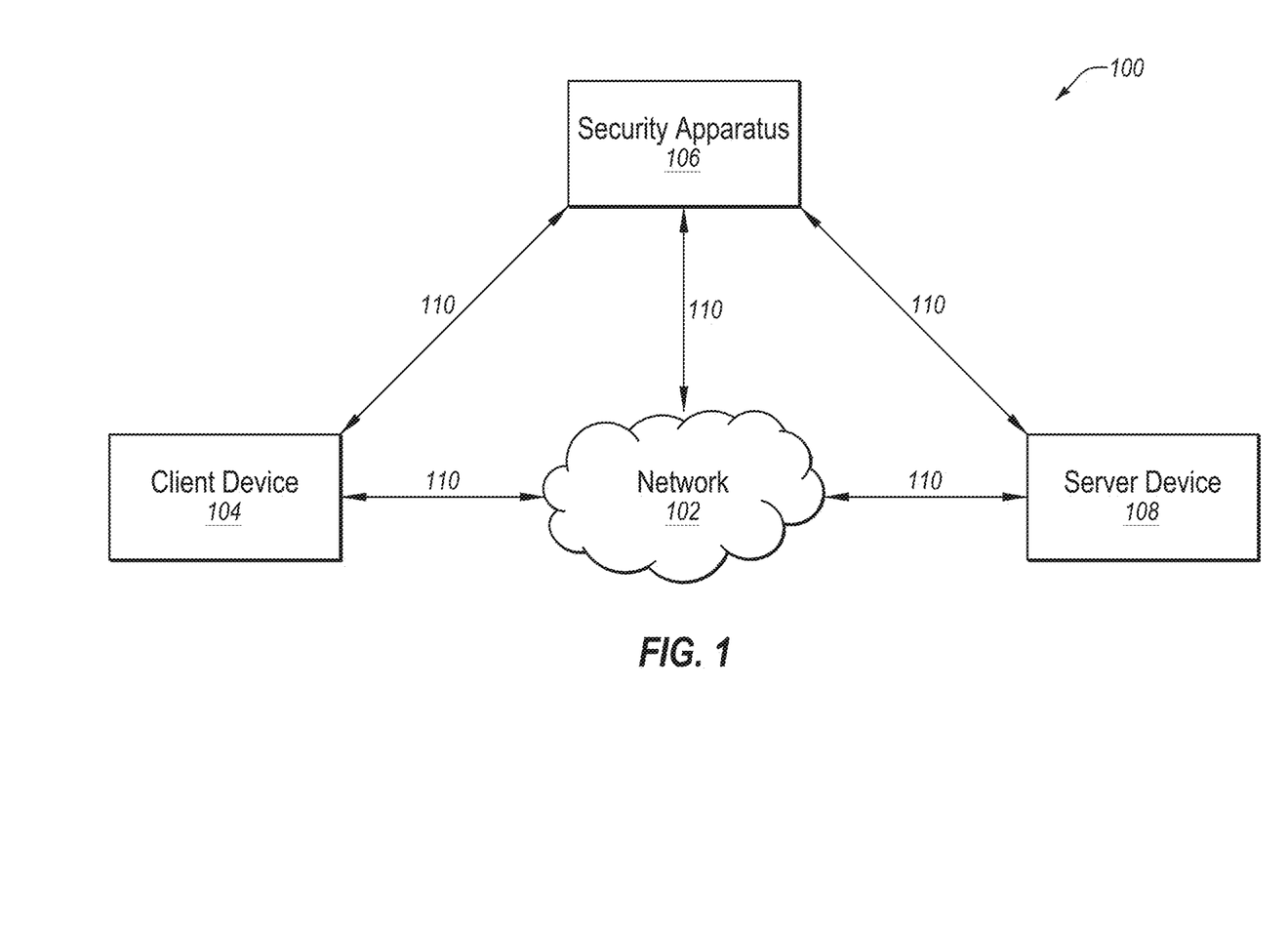
FIG. 1 illustrates an example system configured for adaptive security filtering on a client device.

Turning to the figures, FIG. 1 illustrates an example system 100 configured for adaptive security filtering. The system 100 may include a network 102, a client device 104, a security apparatus 106, and/or a server device 108. In some embodiments, the security apparatus 106 may run a security application described in greater detail with respect to FIG. 2. In an alternative or additional embodiment, the client device 104 may run the security application and/or the server device 108 may run the security application.

In some embodiments, the network 102 may be configured to communicatively couple the client device 104, the security apparatus 106, and/or the server device 108. In some embodiments, the network 102 may be any wired or wireless network, or combination of multiple networks, configured to send and receive communications between systems and devices by way of example communication links 110. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
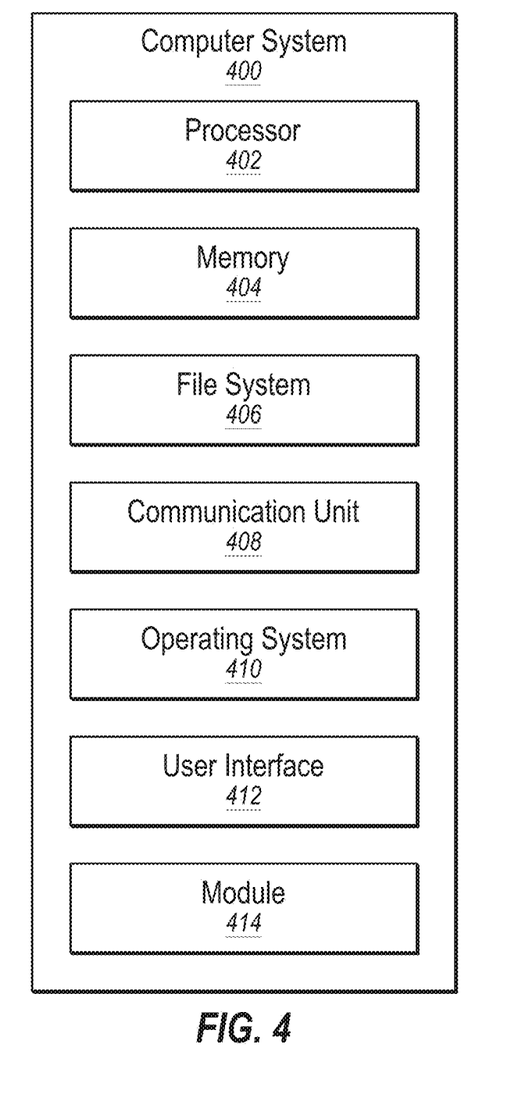
FIG. 4 illustrates an example computer system that may be employed in adaptive security filtering on a client device.

In some embodiments, the client device 104 may be a computer system capable of communicating over the network 102 and capable of, at least, communicating with the security apparatus 106, examples of which are disclosed herein in connection with the computer system 400 of FIG. 4. In some embodiments, the client device 104 may be a computer device, such as a smartphone, desktop computer, laptop computer, control system, tablet, computer wearable device, etc.

In some embodiments, the server device 108 may be any computer system capable of communicating over the network 102 with client device 104 and/or security apparatus 106. In some embodiments, the server device 108 may communicate with the client device 104 through communications with the security apparatus 106. Examples of the server device 108 and/or the security apparatus 106 are disclosed herein in connection with the computer system 400 of FIG. 4.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Further, it is understood that the communication links 110 between the components illustrated in FIG. 1 (illustrated as left-right arrows) may be part of the network 102 or another network.

Figure 2:
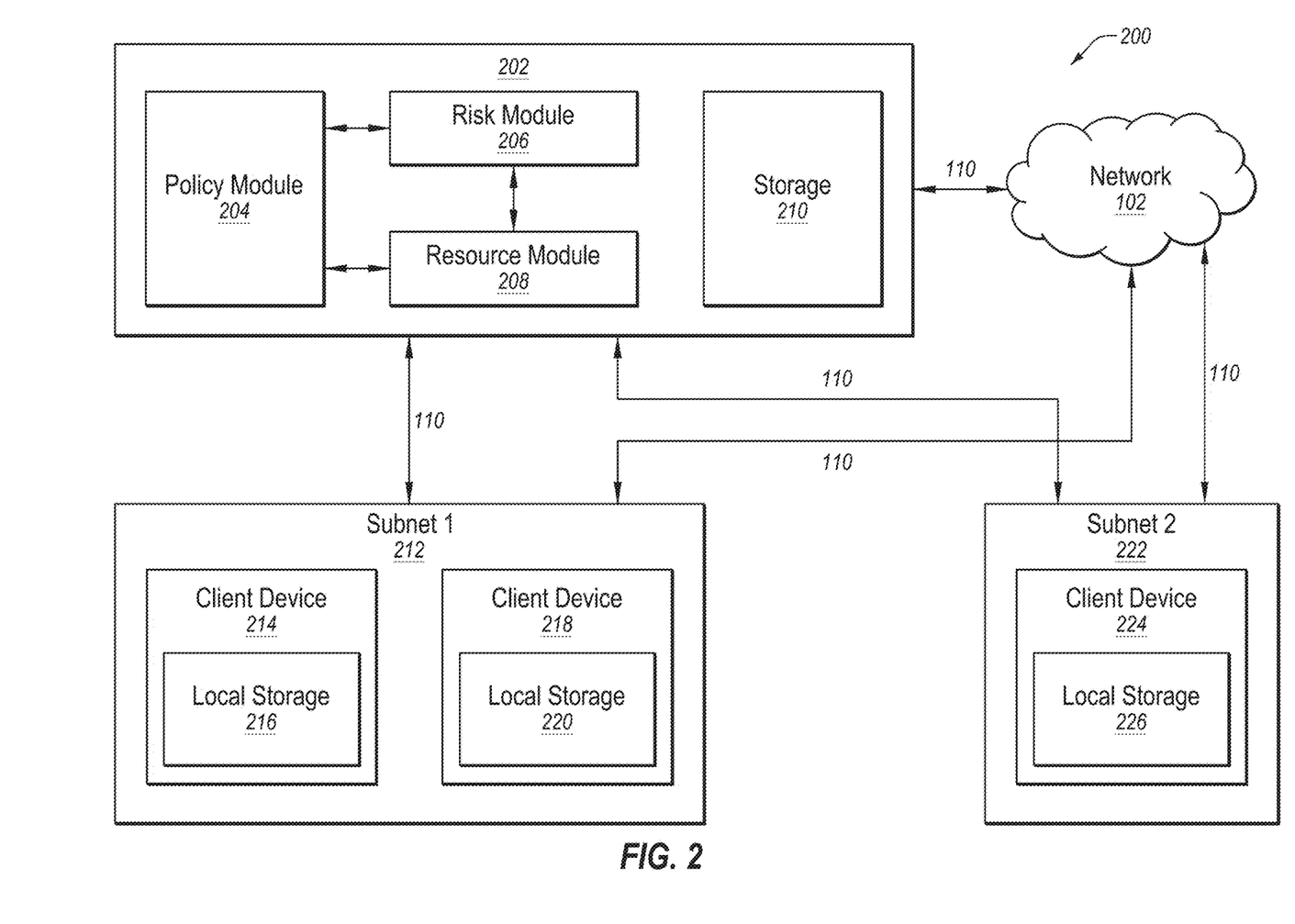
FIG. 2 illustrates an example system configured for adaptive security filtering on a client device.

FIG. 2 illustrates an example system 200 for adaptive security filtering. In one embodiment, system 200 may include a security apparatus 202, which may be a computing device analogous to security apparatus 106 described with respect to FIG. 1. In one embodiment, security apparatus 202 may be a physical Advanced Threat Prevention (ATP) Appliance sold by Symantec Corporation.

System 200 may further include network 102, subnet 212 and subnet 222. In one embodiment, subnet 212 and/or subnet 222 may be subnets operating in an example enterprise network. Although two subnets are shown, any number of subnets, including a single network, may be contemplated. Security apparatus 202, subnet 212, and/or subnet 222 may be in communication with one another by way of communication links 110 through network 102. In one embodiment, subnet 212 may include client devices, such as client device 104 described with reference to FIG. 1. Example client devices 214 and 218 may further include local storage 216, and 220, respectively. Similarly, subnet 222 may include an example client device 224 which may, in turn, include a local storage 226.

In one embodiment, security apparatus 202 may be a hardware appliance or a virtual machine (VM) form factor which may be used to determine (and in some cases, prioritize) advanced attacks entering the enterprise through the network 102.

In one embodiment, the security apparatus 202 may be pre-configured with various levels of adaptive security filters, as well as rules and conditions related to when and how each of the filters may be pushed to each of the variety of endpoint client devices. Example rules may include requesting that specific client devices should report less telemetry in times of network congestion or when the security apparatus (e.g., ATP appliance) is over-subscribed and/or automatically collecting telemetry from a specific client device in the event of a suspicious event (e.g., a full pull of the contents of the ring buffer, a pull of all events from a suspicious process or process graph); increase the amount of data obtained from a specific endpoint; collecting more data from high value endpoints (as well as adjust in more aggressive reporting and security posture of other machines based on communication with high value endpoints).

Thus, in some embodiments, the security apparatus 202 delivered to a client may be pre-configured to report less telemetry in times of network congestion or when the ATP appliance is over-subscribed. Some telemetry will automatically be collected from the endpoint in the event of a suspicious event (for example a full pull of the ring buffer, or a pull of all events from a suspicious process or process graph). Security posture can then be ratcheted up in adjacent machines, given a network communication graph. Different filters will be deployed to collect more data from these endpoints. Customer-specified high-value machines may default to more aggressive reporting and security posture of other machines may be adjusted based on communication with high-value endpoints.

The default set of rules may be an algorithm designed to monitor, record, and/or analyze fine-grained behavioral information about every process running on an endpoint. In some embodiments, control over the default set of rules may be minimal and not particularly adjustable or personalized. For example, an administrator associated with the enterprise may be presented with a default set of rules, where each rule may be "turned on" or "turned off" by selecting a check-box. By deselecting a check-box, the administrator may indicate that he does not want to collect data related to, for example file write events. In such a scenario, however, all write events will be excluded for all of the client devices in the enterprise, as current systems are not set up to provide more particularized rules.

In one embodiment, the algorithm may translate a set of declarative pattern-matching rules into an executable discrimination network that applies conditional tests to facts passed through the network 102. Facts may be fine-grained behavioral events generated on an endpoint (e.g., client device 104, 214, 218, 224), such as a user logging into the system, a process writing to a particular registry key, a user writing to a file, a network connection, cross-process communication, system configuration changes, or launching of an executable or a script.

In one embodiment, upon finding a matching pattern, the security appliance may generate an alert for a security analyst to investigate further. In an additional or alternative embodiment, the security apparatus 202 may update a behavioral summary that may be used for machine learning or other anomaly detecting. The algorithm may be established to record a high-volume stream of events which may exceed the resources and/or need of an enterprise; in some cases, all events may be recorded. Recording all events, however, may tax the resources of the enterprise or otherwise exceed the amount of resources an enterprise can allocate to filtering out potential security issues.

Thus, the security apparatus 202 may include an adaptive security algorithm which may be autonomously and dynamically adjusted to create policy decisions about filtering, gathering, and storing data associated with the processes and events occurring within the enterprise. Implementing the adaptive security algorithm described herein may be additionally efficient in making policy changes based on monitoring an amount of risk, the amount of resources available and used, or a combination of risk and resources. Thus, a policy decision may be implemented in real-time based on an analysis of the resources currently available.

In one embodiment, security apparatus 202 may include policy module 204, risk module 206, and/or resource module 208. In an additional or alternative embodiment, security apparatus 202 may also include storage module 210. In some embodiments, storage module 210 may be associated with a storage module (not specifically shown). Each module may be a software engine working independently or in conjunction with other software engines to make up at least part of the software of security apparatus 202.

In general, the security apparatus 202 may autonomously and dynamically establish at least one adaptive security filter to be applied to a single client device, multiple client devices, a single subnet, multiple subnets, etc. Thus, as opposed to having a default policy applied to an entire enterprise network of computers, the policy module 204 may apply a dynamically determined policy for any number of devices for individually determined reasons, where each of a number of security filters may be adjusted to allow more or less information to be obtained and stored based on a real-time determination of the security posture, current storage availability, and/or current processing capabilities of each individual computing device (e.g., client device) and/or subnet.

In determining an appropriate filtering policy in real-time, the policy module 204 may take into consideration a combination of the current risk determined and the resources available. For example, a specific client device may access sensitive data more frequently than other client devices in each subnet (or in the enterprises), and thus it may be a good idea to gather more information at a more frequent rate from this specific client device. In another example, a database server or a share file server may contain sensitive information, and thus it may be a good idea to increase the security considerations on processes and/or communications associated with the database server or shared file server. In one embodiment, the increased security may be for a predetermined period of time, or may be perpetual for a specific machine. Thus, because the risk may be higher for specific machines, policy module 204 may make a real-time determination to increase data gathering and storage for any process which is implemented on or interacts with the machines determined to have a higher security risk.

Risk module 206 may autonomously and dynamically track the risk of each client device, each subnet, or the enterprise as a whole in order to contribute to whether a policy change would be beneficial from a risk perspective. Thus, in one embodiment, risk module 206 may determine whether there is a higher likelihood of a security risk, where the security risk may occur, and in some cases, what the security risk may be. Risk module 206 may analyze and evaluate endpoint data to determine a risk factor based on, for example, anomaly detection. In an additional or alternative embodiment, risk module 206, may correlate data obtained among different client devices in order to determine whether one device or a group of devices is experiencing suspicious activity.

In an additional or alternative embodiment, risk module 206 may apply a weight to any of the processes or events based on how anomalous or suspicious the process or event appears to be in the context of previously obtained (and in some cases, stored) data. Risk module 206 may thus indicate to policy module 204 that changing a filter on an endpoint would increase or decrease the risk of an attack at an endpoint.

In addition to determining the risk of processes and events at the client devices, security apparatus 202 may determine and consider the use of resources and what resource remain available for use. In one embodiment, resource module 208 may analyze telemetry (e.g., data) obtained from client devices in order to monitor the resource consumption and resource availability of the enterprise (or of any of the subnets 212, 222, client devices 104, 214, 218, 224, storage module, local storage 216, 220, 226). In one embodiment, monitoring the resource consumption and available may be historical, current, or anticipated based on a number of factors. For example, the resource module 208 may monitor consumed and available bandwidth, used and available storage capacity, monetary costs associated with processing, etc.

The resource module 208 may analyze the resources being used in order to determine that a process or an event places the subnets or the client devices under strain. In such a situation, the resource module 208 may indicate to the policy module 204 that a policy change on one or more endpoints would improve resource consumption. In an additional or alternative embodiment, resource module 208 may determine what resources are available and anticipate what resources would be used or be available based on any number of policy changes.

Thus, in one embodiment, resource module 208 may provide an indication to policy module 204 that the filtering should be increased or decreased at an endpoint or a number of end points. In one embodiment, risk module 206 may be solely responsible for affecting a policy change, where the filtering of an endpoint is increased or decreased. In an alternative embodiment, resource module 208 may be solely responsible for affecting a policy change, where the filtering of an endpoint is increased or decreased. In another embodiment, the combination of the risk module 206 and the resource module 208 may be responsible for affecting a policy change, where the filtering of an endpoint is increased or decreased.

In one embodiment, the policy module 204 autonomously and dynamically selects or adjusts a system policy by adapting one or more filters (increases or decreases the amount of data obtained) in order to deploy an optimal policy at an optimal time for at least one appropriate endpoint. The policy module 204 may adapt at least one filter based on determinations made by the risk module 206, the resource module 208, or a combination of the risk module 206 and the resource module 208.

As discussed with resulted to the risk module 206 and resource module 208, the policy module 204 may adjust a policy based on whether a specific client device is determined to be a critical system or is dealing with sensitive data, whether a recent incident has been determined, whether a specific client device has a high connectivity to other devices determined to have been recently infected, and the like.

In the embodiment where risk module 206 has determined a potentially suspicious event or an anomaly, policy module 204 may decrease a filter to allow more data to pass from the client device into storage module 210, as the suspicious event or anomaly may mean nothing in isolation, but may be determined to be indicative of an attack in the aggregate with other obtained data.

In an additional or alternative embodiment, the policy module 204 may establish or adjust a filter to capture data related to a specific type of process or event, such as a process launch from a specific executable or with a particular command line used. In an additional or alternative embodiment, the policy module 204 may establish or adjust a filter for a specific client device, for a specific subnet, during specific times from specific computing devices, etc. Regardless of the specific policy establishment or adjustments, policy module 204 may establish or alter a policy at a fine-grained level due to the fact that the risk and resources of the enterprise, the subnets, and the client devices may be in constant flux over time; adjustment of the policies is similarly reflected in real-time and on a fine-grained level.

Changing the policy to adjust filters may result in less or more data being stored in storage module 210. In one embodiment, a security analyst may scrutinize the data obtained from endpoints across the enterprise in order to participate in forensic investigation, detection of malicious behaviors and historical, current, or anticipated security attacks that may have gone unnoticed if the data was either not obtained due to an overly aggressive and non-specific default filter, or a lax filter that resulted in the collection of too much data to be analyzed.

In one embodiment, storage module 210 may be a database associated with the security appliance and may store any or all of the data that is obtained as a result of implementing the filters. The storage module 210 may further be associated with a storage module (not specifically shown), which may implement an additional filtering determination on top of a policy determination implemented by the policy module 204. For example, policy module 204 may implement a real-time policy to obtain data that satisfies the current policy, with data that satisfies the current policy intended to be stored in storage module 210. However, storage module 210 may determine that only some of the data appears to be interesting enough to be stored for later analysis, and may opt to discard at least some of the data intended for storage. In an additional or alternative embodiment, the storage module may operate in conjunction with the risk module 206 and the resource module 208 to make a determination as to what data may be stored and what data may be discarded based on a risk/resource tradeoff.

Figure 3:
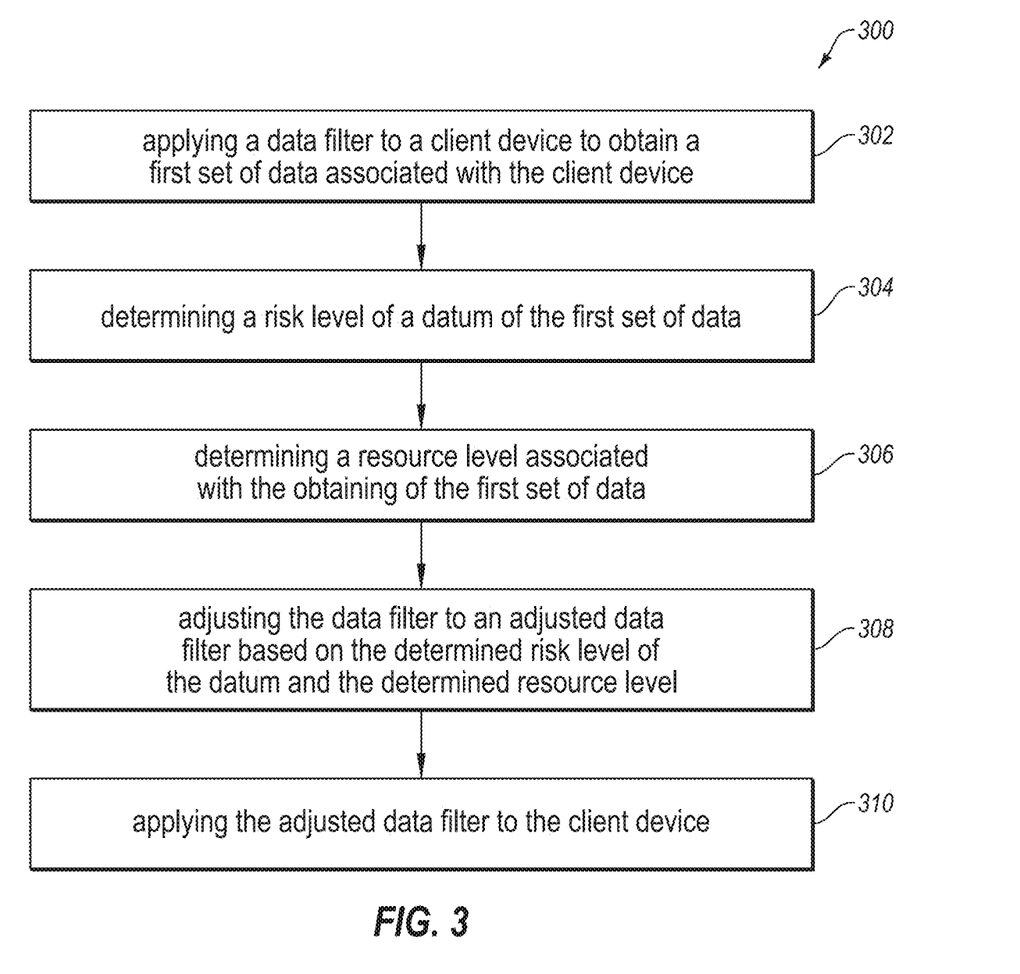
FIG. 3 illustrates a flowchart of an example method for adaptive security filtering on a client device.

FIG. 3 illustrates an example method 300 for adaptive security filtering. The method 300 may be performed, in some embodiments, by a device or system, such as by client device 104, security apparatus 106, the server device 108, the security apparatus 202, client device 214, client device 218, and/or client device 224, operating independently or on one of the other described devices. In these and other embodiments, the method 300 may be performed by one or more processors based on one or more computer-readable instructions stored on one or more non-transitory computer-readable media. The method 300 will now be described in connection with FIGS. 1 and 2.

Method 300 may include, at action 302, applying a first data filter to a client device to obtain a first set of data associated with the client device. In one embodiment, the first data filter may be a data filter that is pre-configured with delivery of the security apparatus 202 to enable all data related to, for example, writing a file or network connections to be recorded and saved.

Method 300 may include, at action 304, determining a risk level of a datum of the first set of data. For example, risk module 206 may consistently, or at pre-determined intervals, evaluate the risk of a security attack on an endpoint, at a subnet comprising at least one endpoint, or the enterprise as a whole based on determining the presence of at least one of a plurality of risk factors. Risk factors may include, but are not limited to, suspicious behavior, anomalies, presence of malware, suggestions of malware, increased or decreased activity at an endpoint, etc.

Method 300 may include, at action 306, determining a resource level associated with obtaining the first set of data. For example, resource module 208 may determine the historical, current, and/or anticipated consumption of and/or availability of resources in obtaining telemetry data and analyzing potential security threats, including determining network bandwidth, storage usage and availability, processing power, etc.

Method 300 may include, at action 308, adjusting the first data filter to an adjusted filter based on determining the risk level of the datum and determining the resource level. For example, a policy related to a filter may be determined autonomously and dynamically (and in real-time) based on the risk determined by the risk module 206, the resource module 208, or a combination thereof. For example, the filter may be ratcheted up or down based on a determination that more or less data is needed at a specific time or during a specific timeframe from a specific endpoint or a combination of endpoints, or a subnet or a combination of subnets.

Method 300 may include, at action 310, applying the adjusted filter to the client device. For example, the adjusted filter may be applied to a specific endpoint or endpoints, or a subnet or a combination of subnets. In one embodiment, the adjusted filter may be applied at a specific time, for a pre-determined period of time, or may be applied until a specific amount of data is gathered.

Although the actions of the method 300 are illustrated in FIG. 3 as discrete actions, various actions may be divided into additional actions, combined into fewer actions, reordered, expanded, or eliminated, depending on the desired implementation.

The system and methods described may provide a plurality of benefits and technological improvements. In one embodiment, autonomously and dynamically adjusting a data filter may increase the efficiency of enterprise resources, network resources, and endpoint resources, including decreasing the financial burden of security monitoring. Furthermore, autonomously and dynamically altering the adaptive security filter may result in quicker and more efficient recognition of potential and current security attacks, without resorting to remedial actions.

The systems and methods described herein result in the practical application of identifying the potential of a security attack on a computing device outside of or part of a network of computing devices, such as with an enterprise. By resulting in the practical application of identifying the potential of a security attack, a remedial security action may be implemented to avoid or reduce the consequences of a malicious attack.

FIG. 4 illustrates an example computer system 400 that may be employed in adaptive security filtering. In some embodiments, the computer system 400 may be part of any of the systems or devices described in this disclosure. For example, the computer system 400 may be part of the client device 104, the security apparatus 106, the server device 108 of FIG. 1 and the client devices 214, 218, 224 and/or the security apparatus 202 of FIG. 2.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of method 300 of FIG. 3. These computer-executable instructions may be included, for example, in the operating system 410, in one or more applications, such as policy module 204, risk module 206, resource module 208, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, a 402.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of method 300 of FIG. 3. In some embodiments, the module 414 may be part of the operating system 410 or may be part of an application of the computer system 400, or may be some combination thereof. In some embodiments, the module 414 may function as policy module 204, risk module 206, resource module 208, and/or storage module 210 of FIG. 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for adaptive security filtering on a plurality of client devices within an enterprise, at least a portion of the method being performed by a computing device comprising one or more processors, the method comprising:
    applying a pre-configured data filter to a first client device within the enterprise to obtain a first set of data associated with the first client device;
    applying the pre-configured data filter to a second client device within the enterprise to obtain a second set of data associated with the second client device;
    adjusting the pre-configured data filter applied to the first client device to a first adjusted data filter that increases the amount of data obtained from the first client device based on a suspicious event detected in the first set of data;
    applying the first adjusted data filter to the first client device;
    adjusting the pre-configured data filter applied to the second client device to a second adjusted data filter that decreases the amount of data obtained from the second client device based on an increase in resource consumption, the increase in resource consumption being caused at least in part by the increased amount of data obtained from the first client device; and
    applying the second adjusted data filter to the second client device.

2. The method of claim 1, further comprising:
    storing the first set of data in memory based on the detection of the suspicious event.

3. The method of claim 1, wherein the obtaining of the first set of data further comprises:
    obtaining process data associated with the first client device.

4. The method of claim 3, wherein the obtaining of the process data further comprises:
    obtaining data associated with: a user logging onto the first client device, a user logging the first client device onto a network, writing to a file, obtaining access to a file, deleting a file, writing to a registry key, a process launch from an executable, or use of a command line argument, or a combination thereof.

5. The method of claim 1, wherein the increase in resource consumption is based on a current usage of computing resources, a future usage of computing resources, an availability of current computing resources, or an available of future computing resources, or a combination thereof.

6. The method of claim 5, wherein the increase in resource consumption is based on network bandwidth, processing power, or a storage amount, or a combination thereof.

7. The method of claim 1, wherein the pre-configured data filter is a default data filter that is initially applied to all client devices within the enterprise.

8. A computing device for adaptive security filtering on a plurality of client devices within an enterprise, comprising:
    a processor;
    a memory in electronic communication with the processor; and
    instructions stored in the memory, the instructions being executable by the processor to:
        apply a pre-configured data filter to a first client device within the enterprise to obtain a first set of data associated with the first client device;
        apply the pre-configured data filter to a second client device within the enterprise to obtain a second set of data associated with the second client device;
        adjust the pre-configured data filter applied to the first client device to a first adjusted data filter that increases the amount of data obtained from the first client device based on a suspicious event detected in the first set of data;
        apply the first adjusted data filter to the first client device;
        adjust the pre-configured data filter applied to the second client device to a second adjusted data filter that decreases the amount of data obtained from the second client device based on an increase in resource consumption, the increase in resource consumption being caused at least in part by the increased amount of data obtained from the first client device; and
        apply the second adjusted data filter to the second client device.

9. The computing device of claim 8, wherein the instructions are further executable by the processor to:
    store the first set of data in the memory based on the detection of the suspicious event.

10. The computing device of claim 8, wherein when the processor obtains the first set of data, the instructions are further executable to:
   obtain process data associated with the first client device.

11. The computing device of claim 10, wherein when the processor obtains the process data, the instructions are further executable to:
   obtain data associated with: a user logging onto the first client device, a user logging the first client device onto a network, writing to a file, obtaining access to a file, deleting a file, writing to a registry key, a process launch from an executable, or use of a command line argument, or a combination thereof.

12. The computing device of claim 8, wherein the increase in resource consumption is based on a current usage of computing resources, a future usage of computing resources, an availability of current computing resources, or an available of future computing resources, or a combination thereof.

13. The computing device of claim 12, wherein the increase in resource consumption is based on network bandwidth, processing power, or a storage amount, or a combination thereof.

14. The computing device of claim 8, wherein the pre-configured data filter is a default data filter that is initially applied to all client devices within the enterprise.

15. One or more non-transitory computer-readable media comprising one or more computer readable instructions that, when executed by one or more processors of a computing device, cause the computing device to perform a method for adaptive security filtering on a plurality of client devices within an enterprise, the method comprising:
   applying a pre-configured data filter to a first client device within the enterprise to obtain a first set of data associated with the first client device;
   applying the pre-configured data filter to a second client device within the enterprise to obtain a second set of data associated with the second client device;
   adjusting the pre-configured data filter applied to the first client device to a first adjusted data filter that increases the amount of data obtained from the first client device based on a suspicious event detected in the first set of data;
   applying the first adjusted data filter to the first client device;
   adjusting the pre-configured data filter applied to the second client device to a second adjusted data filter that decreases the amount of data obtained from the second client device based on an increase in resource consumption, the increase in resource consumption being caused at least in part by the increased amount of data obtained from the first client device; and
   applying the second adjusted data filter to the second client device.

16. The non-transitory computer-readable media of claim 15, wherein the increase in resource consumption is based on a current usage of computing resources, a future usage of computing resources, an availability of current computing resources, or an availability of future computing resources, or a combination thereof.

17. The non-transitory computer-readable media of claim 16, wherein the increase in resource consumption is based on network bandwidth, processing power, or a storage amount, or a combination thereof.

18. The non-transitory computer-readable media of claim 15, wherein the obtaining of the first set of data further comprises:
   obtaining process data associated with the first client device.

19. The non-transitory computer-readable media of claim 18, wherein the obtaining of the process data further comprises:
   obtaining data associated with: a user logging onto the first client device, a user logging the first client device onto a network, writing to a file, obtaining access to a file, deleting a file, writing to a registry key, a process launch from an executable, or use of a command line argument or a combination thereof.

20. The non-transitory computer-readable media of claim 15, wherein the pre-configured data filter is a default data filter that is initially applied to all client devices within the enterprise.

* * * * *